Dec. 18, 1956  J. H. WILSON  2,774,453
PNEUMATIC CLUTCHES
Original Filed Nov. 23, 1948  10 Sheets-Sheet 7

INVENTOR.
John Hart Wilson
BY
Wayland D. Keith
HIS AGENT

Dec. 18, 1956   J. H. WILSON   2,774,453
PNEUMATIC CLUTCHES
Original Filed Nov. 23, 1948   10 Sheets-Sheet 9

INVENTOR.
John Hart Wilson
BY Wayland D Keith
HIS AGENT

United States Patent Office 2,774,453
Patented Dec. 18, 1956

2,774,453

PNEUMATIC CLUTCHES

John Hart Wilson, Wichita Falls, Tex.

Continuation of application Serial No. 61,565, November 23, 1948. This application December 8, 1954, Serial No. 473,943

4 Claims. (Cl. 192—88)

This invention relates to improvements in Pneumatic Clutches of the character adapted particularly for use on the drums of well drilling rigs and other heavy machinery, for connecting a source of power with a driven member.

Well drilling rigs include a winding drum that is adapted to be driven at different speeds under different conditions for winding a cable thereon. It has been customary heretofore to provide separate high speed and low speed positive clutches connected with the drum shaft at the respective opposite ends of the winding drum for selectively transmitting power thereto through the drum shaft. Since the winding drum must be operated frequently at relatively high speeds or under heavy load conditions, these clutches are subjected to severe wear.

An object of this invention is to improve the construction of clutches adapted for this purpose, to enable the power to be transmitted directly to the driven member even under high speed or heavy load conditions without an appreciable generation of heat between the operating parts, and with a dissipation of such heat as is generated therein.

A further object of the invention is to provide for the operation of clutches through pneumatic means, utilizing a pneumatic power device connected directly in the clutch itself, for the application of pressure thereby to the clutching surfaces, so as to insure of a proper actuating connection therebetween without requiring mechanical connections with the clutch, such as have been necessary heretofore in mechanically operated clutches.

Another object of the invention is to provide for transmitting two speeds to a drum through fluid actuated clutches contained within the drum and the brake ring assembly thereof, the clutches serving to transmit the power directly to the drum without imposing a torsional strain on the supporting shaft thereof.

Still another object of the invention is to improve the construction of such pneumatically actuated clutches to enable these to apply clutch engagement efficiently between the coacting surfaces and to be effective for the purpose under all operating conditions that may be encountered in the use of the clutch.

Another object of this invention is to provide a hoisting drum with water cooled brake rings in which two friction clutches are located, one inside each of the brake rings to provide two speeds to the drum, without transmitting the power through the drum shaft, thus to form a more compact, light weight and more readily transportable unit.

A further object of the invention is to provide a hoisting drum with dual friction clutches of the fluid actuated type, in which the actuating fluid is conducted by conduits intermediate the respective clutch and drum end, and thence through a passage formed in the respective clutch driving rings and thence to the respective fluid actuated elements located at that side of the respective clutch friction elements remote from the drum.

The application of even power to the clutch is especially important where the clutch is operating under high speed, when deflection of the operating member by centrifugal force tends to interfere with clutch actuation.

These objects may be accomplished, according to one embodiment of the invention, by the use of a pneumatic, yieldable and flexible power member arranged to apply force between the coacting surfaces of the clutch, and preferably bonded to a plate to prevent distortion by centrifugal force, and a suitable connection with a source of fluid under pressure. The pneumatic device is contained in the clutch as a part of the structure thereof, and provision is made for supplying power thereto through the power shaft or axle of the body being rotated, so as not to require external mechanical connections, as has been necessary heretofore with mechanical clutches.

In this embodiment of the clutch it is preferred to utilize a pneumatically expansible tube mounted in the clutch for the application of pressure against the coacting surfaces. The tube is so constructed and assembled in the clutch as not to be distorted by centrifugal force as applied thereto by rapid rotation thereof. It is also constructed to withstand the heavy pressures to which it may be subjected and is securely mounted for expansive action under operating conditions. This pneumatic tube acts against coacting surfaces so constructed and arranged as to dissipate heat resulting from the clutch engagement, the coacting surfaces being insulated from the pneumatic tube, provision being made for circulation of air to increase the effectiveness of the insulation.

Provision is made also to facilitate access to the operating parts of the clutch, for assembly, repair and replacement as desired. It is a feature of the invention that the fluid actuated expansible tube is disposed at that side of the clutch remote from the drum, whereby the tube is readily accessible for maintenance purposes.

A further object of the invention is the provision in a hoisting drum having a brake ring at one or both ends thereof and a clutch within the brake ring, of fluid actuated means located at that side of the clutch remote from the drum for engaging the clutch, a water jacket within the brake ring for cooling the latter, and means for circulating water through the jacket.

The invention is illustrated more particularly in the accompanying drawings, in which.

Figure 1:
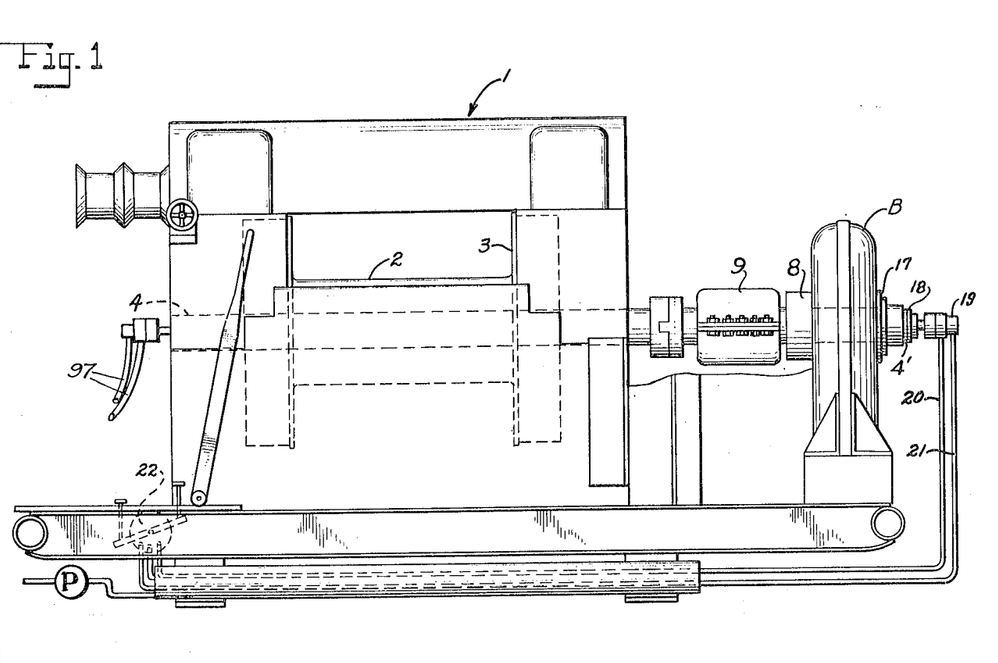
Fig. 1 is a side elevation of a well drilling rig, showing one embodiment of the invention applied to the drum thereof.
Figure 3:
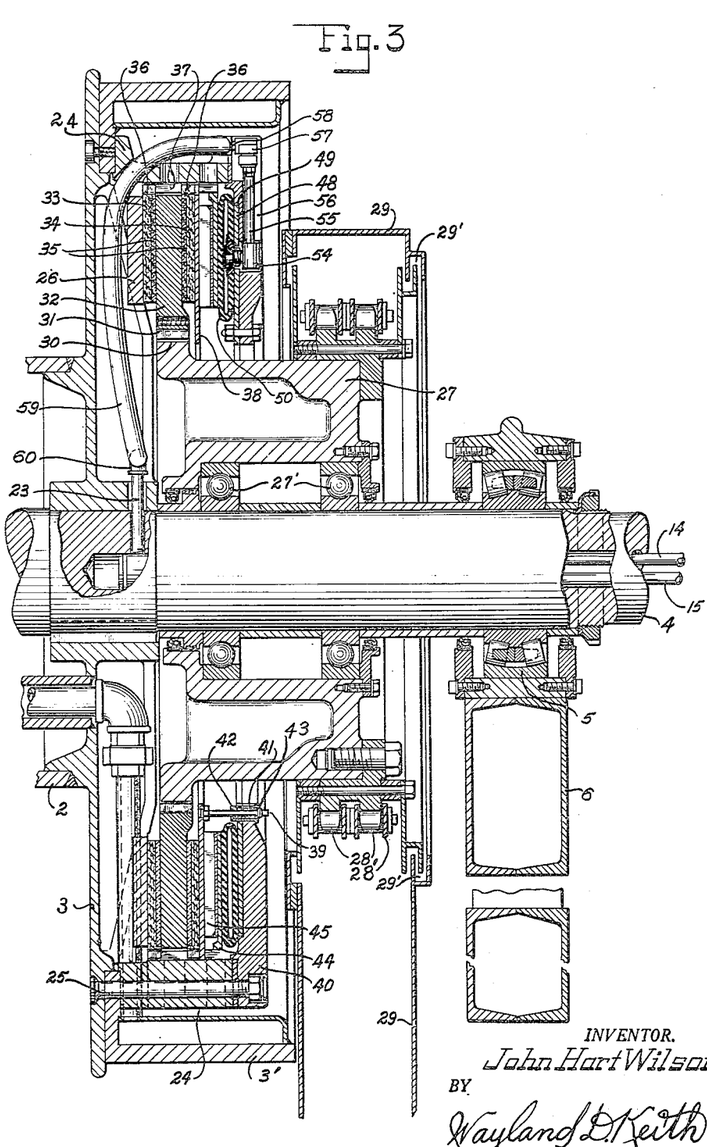
Fig. 3 is a similar view through one of the clutches adapted for operation at high speed.
Figure 5:
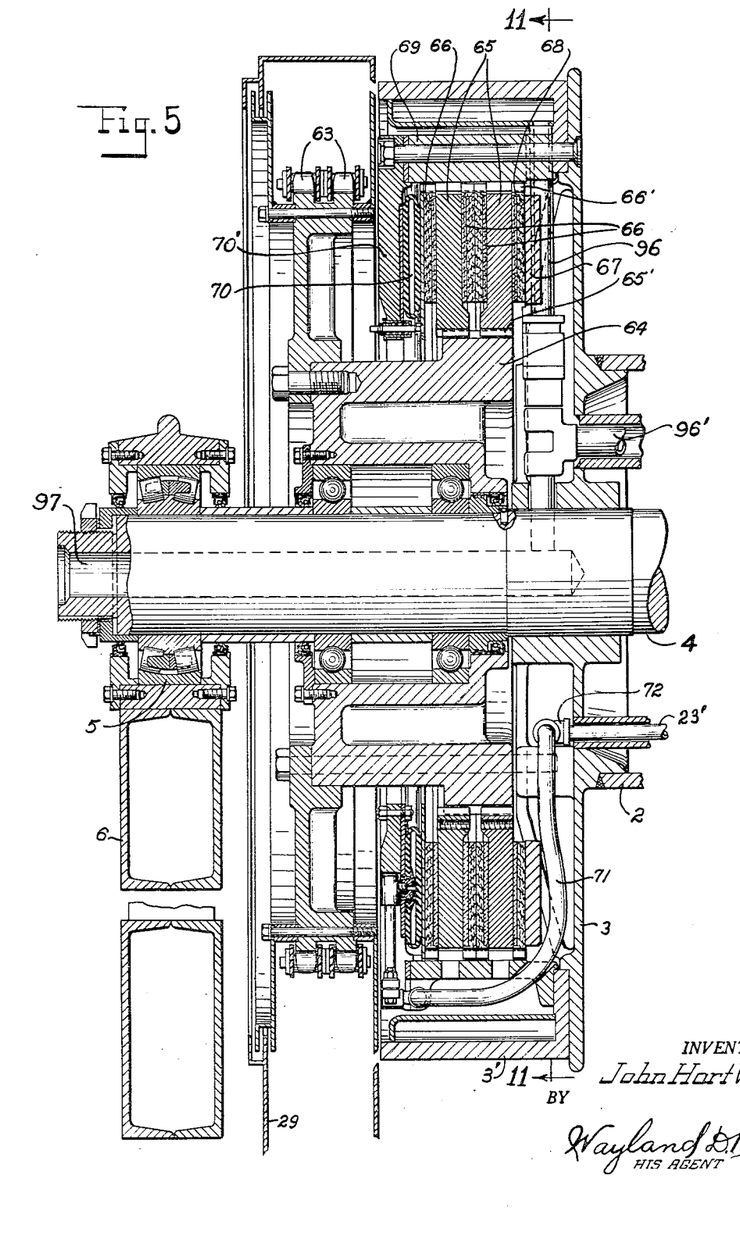
Fig. 5 is a view similar to Fig. 3, showing a low speed clutch having multiple clutch plates.

The invention is shown, for the purpose of illustration, as applied to the drum of a well drilling rig generally designated by the numeral 1, including a winding drum 2 having flanges 3 at opposite ends thereof, each carrying a brake ring 3' thereon with which brake band elements (not shown) cooperate to retard or stop the movement of the drum at will. The construction and operation of the winding drum 2 is well known in the art and may be of any desired or usual character. The winding drum 2 is mounted on a shaft 4, which shaft 4 is shown in Figs. 3 and 5, as journaled in bearings 5 mounted on suitable supports 6 which are parts of the rig 1.

Figure 2:
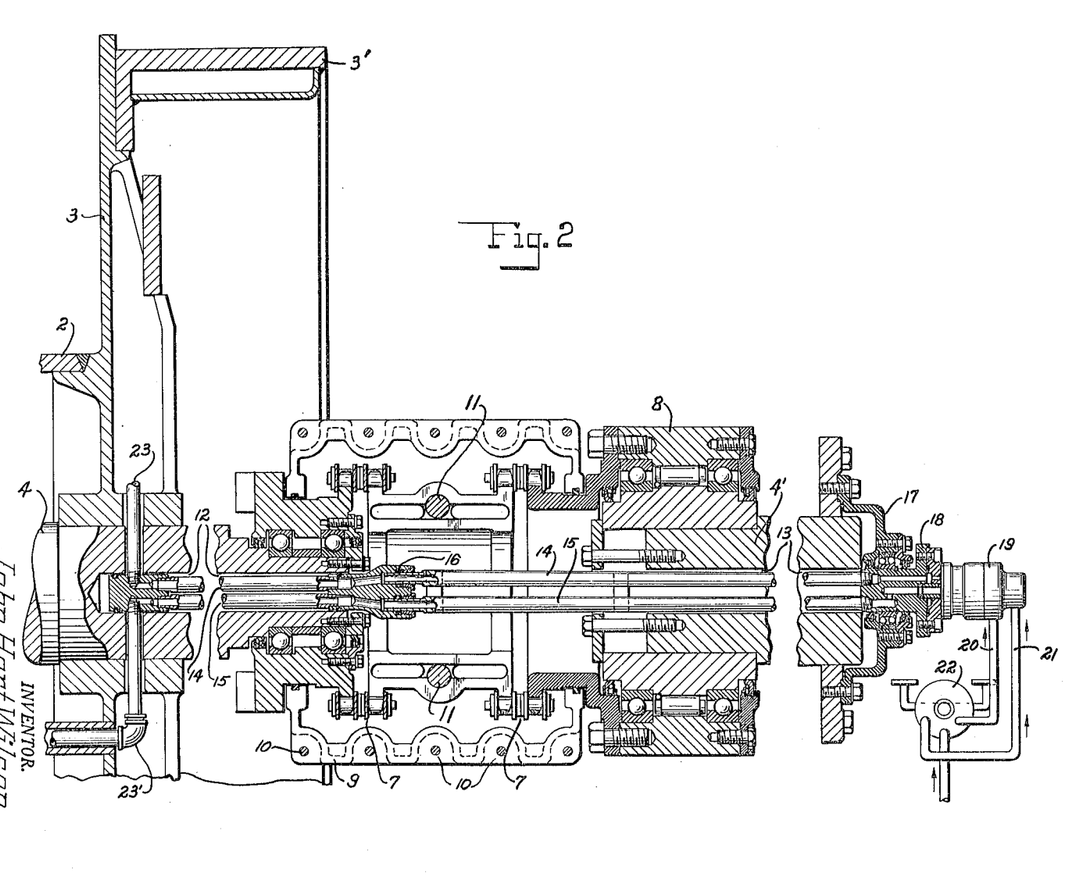
Fig. 2 is a longitudinal sectional view through a portion of the shaft structure of the drum thereof, with parts omitted for clearness of illustration.

The shaft 4 usually has connected therewith a brake B and other elements of the well drilling rig, the details of which are omitted for clearness of illustration, since these are well understood in the art. The shaft 4 is shown in Fig. 2, as connected with an aligned section 4' of the shaft through a flexible coupling, generally designated at 7, and a free wheeling clutch 8, the construction and manner of operation of which are well known in this art. The flexible coupling is enclosed within a housing 9 which housing is made in two parts, bolted together at 10 and capable of separation for detachment of the sections to gain access to the interior. The connecting sprocket member of the flexible coupling 7 is also made in two halves, semi-rigid, and bolted together at 11 for separation to gain access to the interior thereof.

The shaft section 4' has an axial bore 13 extending therethrough, and the shaft 4 has an axial bore 12 extending therethrough in alignment with the bore 13, as shown in Fig. 2. The bores 12 and 13 are adapted to receive therethrough a conduit assembly comprising conduits 14 and 15 secured in rigid relation to each other and adapted to supply air under pressure to the respective high speed and low speed clutches, as hereinafter described. Any suitable fluid may be used for actuating the clutches and thereby controlling the driving of the drum 2. These conduits 14 and 15 are adapted to be introduced or removed from the bores as a unit, and have flexible joints 16 intermediate the length thereof in position to allow for flexure of the coupling 7.

At the outer end of the shaft section 4', the conduits 14 and 15 are connected with a rotary fluid joint comprising a rotatable connector section 18 journaled in a head 17, section 18 rotating with the shaft 4 and coacting with a stationary head section 19. The head section 19 communicates with tubes 20 and 21 which extend to a suitable control valve 22 (Figs. 1 and 2) for regulating the control of air under pressure to the respective conduits.

The inner ends of the conduits 14 and 15 are connected through conduits 23 and 23', respectively, with the high- and low-speed clutch devices, as shown more in detail in Figs. 3 and 5.

Figure 4:
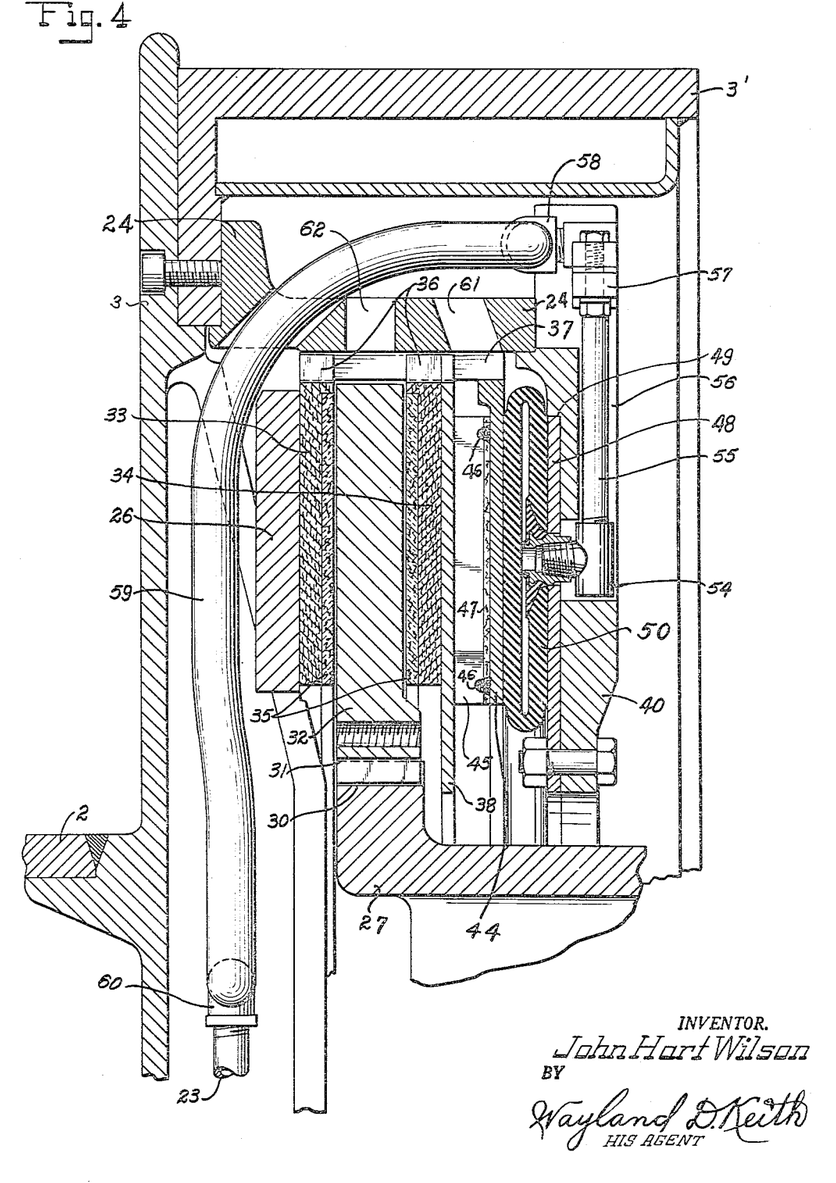
Fig. 4 is a view similar to Fig. 3, on an enlarged scale of a portion of the high speed clutch.

Figs. 3 and 4 show one form of high-speed clutch for operating the drum 2 from a suitable source of power, connection to the drum being effected through an annular clutch driven ring 24 which is secured by bolts 25 to one of the flanges 3 of the drum 2 at the high speed end thereof. Also secured to the flange 3 is a back-up plate 26.

A drum-driving member or spider 27 is journaled on bearings 27' on the shaft 4, which drum-driving member 27 has a sprocket wheel 28 mounted thereon for operation by a sprocket chain, which sprocket chain 28' extends to the source of power through a suitable chain guard 29. The chain guard 29 is provided with a suitable oil seal 29' around the sprocket wheel 28. In the form shown in Fig. 3, the oil seal is of the labyrinth type.

The driving member 27 has a series of teeth 30 formed on the periphery thereof, which teeth are in constant mesh with a series of coacting teeth generally indicated at 31 on the inner edge of a clutch plate 32. The clutch plate 32 is fitted directly on the periphery of the driving member 27, although slidable axially relative thereto, with the teeth 30 and 31 in constant mesh so as to cause positive rotation of the clutch plate 32 upon rotation of the driving member 27.

Mounted on the opposite sides of the driving clutch plate 32 are driven clutch discs, generally designated at 33 and 34, respectively, in position for frictional engagement at their inner faces against the adjacent side faces of the driving clutch plate 32. Each of the driven clutch discs 33 and 34 preferably includes a section of woven asbestos material, indicated at 35, on the inner face thereof which, nevertheless, may be molded in one unit with the body of the clutch disc 33 or 34, which body may also be of molded asbestos of sufficient strength and rigidity to withstand the pressure required.

The periphery of each of the discs 33 and 34 is formed with teeth 36 that intermesh with teeth 37 on the inner surface of the ring 24, in constant interfitting relation therewith, so as to form a secure connection between the clutch discs 33 and 34 and the driven ring 24, causing direct and positive rotation of the latter, and, therefore, of the drum 2, whenever the clutch discs 33 and 34 are driven.

The clutch disc 33 is adapted to engage the back-up plate 26 when pressure is applied against the opposite side thereof through the plate 32 and the clutch disc 34. To provide for the application of pressure thereto in clutch engagement, I have shown a supporting plate 38 secured to the adjacent side of the clutch disc 34. As shown at the bottom in Fig. 3, the supporting plate 38 is connected to circumferentially spaced pins 39 for retracting the plate 38 and the clutch disc connected thereto. Each of the pins 39 is secured to the plate 38 at one end thereof, and at its opposite end extends through an annular cover plate 40, which is secured to the clutch ring 24 by the bolts 25, hereinbefore mentioned, as shown in Fig. 3. A coiled spring 41 is sleeved over each of the pins 39 within a sleeve 42 seated in cover plate 40, and bears outwardly against a snap ring 43 fixed to the pin 39, whereby the several circumferentially spaced springs will apply uniform yieldable action to the plate 38 tending to release the clutch 24 by the bolts 25, hereinbefore mentioned.

Figure 12:
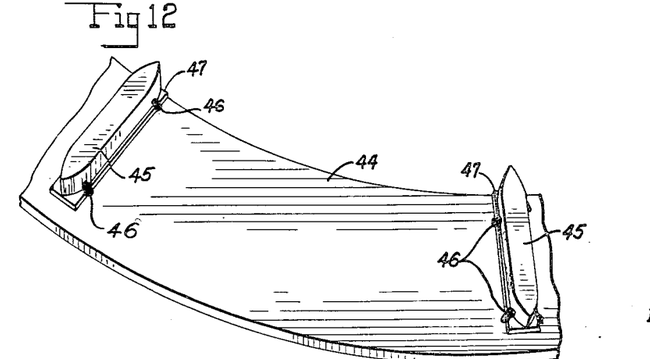
Fig. 12 is a detail perspective view of a portion of one of the clutch rings showing the spacers thereon.

A pressure plate 44 is spaced laterally from the plate 38 and has interposed therebetween a series of ribs 45, each formed of a radially extending bar, which ribs 45 are spaced apart circumferentially (Fig. 12) a sufficient distance for the ready circulation of air therebetween. Each rib 45 is secured to the plate 44 by welding at spaced points, as indicated at 46, or in any other suitable manner, and interposed between the edge of the rib 45 and the plate 44 is a strip 47 of heat insulating material, such as asbestos. This strip prevents any appreciable transfer of heat from the rib to the plate 44. One or both of the opposite ends of each rib 45 may be tapered, as shown in Fig. 12.

Figure 8:
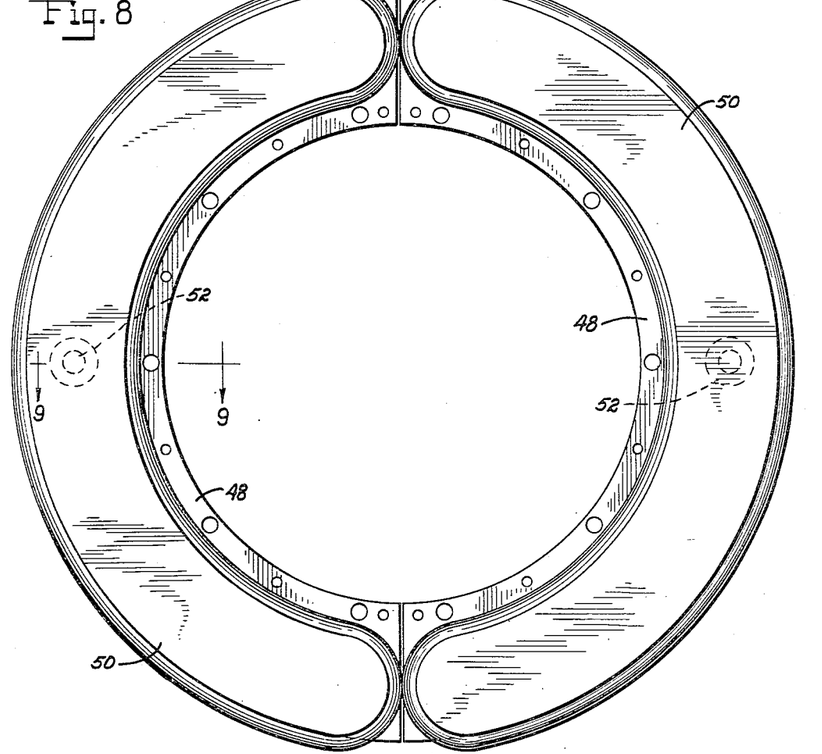
Fig. 8 is a side elevation of a split air tube removed from the clutch.

Secured to the cover plate 40 is a support plate 48 enclosed at its periphery by an annular shoulder 49 formed in the cover plate 40. The plate 48 is made in two sections, in the form of the invention illustrated in Fig. 8, and each section thereof carries on its inner face a semi-circular air tube, generally indicated at 50. The air tubes 50, which are separated from each other in this embodiment, are arranged in end to end relation to form substantially an annular expansion device, interposed between the plate 48 and the adjacent face of the pressure plate 44, and capable of expanding axially to apply frictional engagement to the opposed clutch plates.

Figure 7:
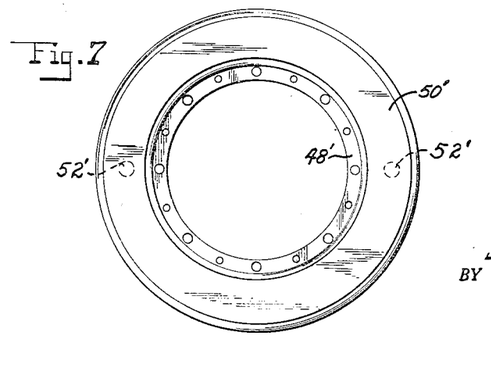
Fig. 7 is a side elevation of an annular air tube, detached.

While the form of the invention as described may use semi-circular air tubes 50, it is also practical to make a completely annular air tube, as shown at 50' in Fig. 7. This annular air tube 50' would be made and used in the same manner as the semi-circular air tubes 50. The annular air tube 50' is mounted on an annular support plate 48'. Connections preferably are made at opposite sides of the air tube 50'.

Figure 9:
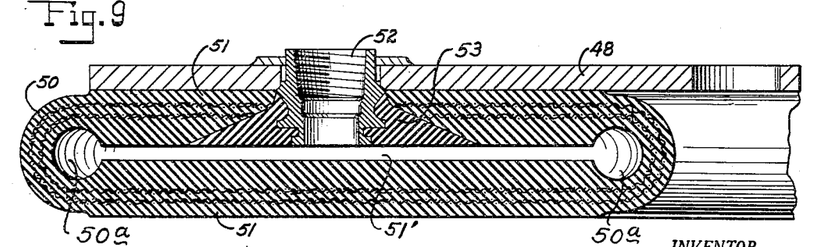
Fig. 9 is a transverse section thereof on the line 9—9 in Fig. 8.
Figure 10:
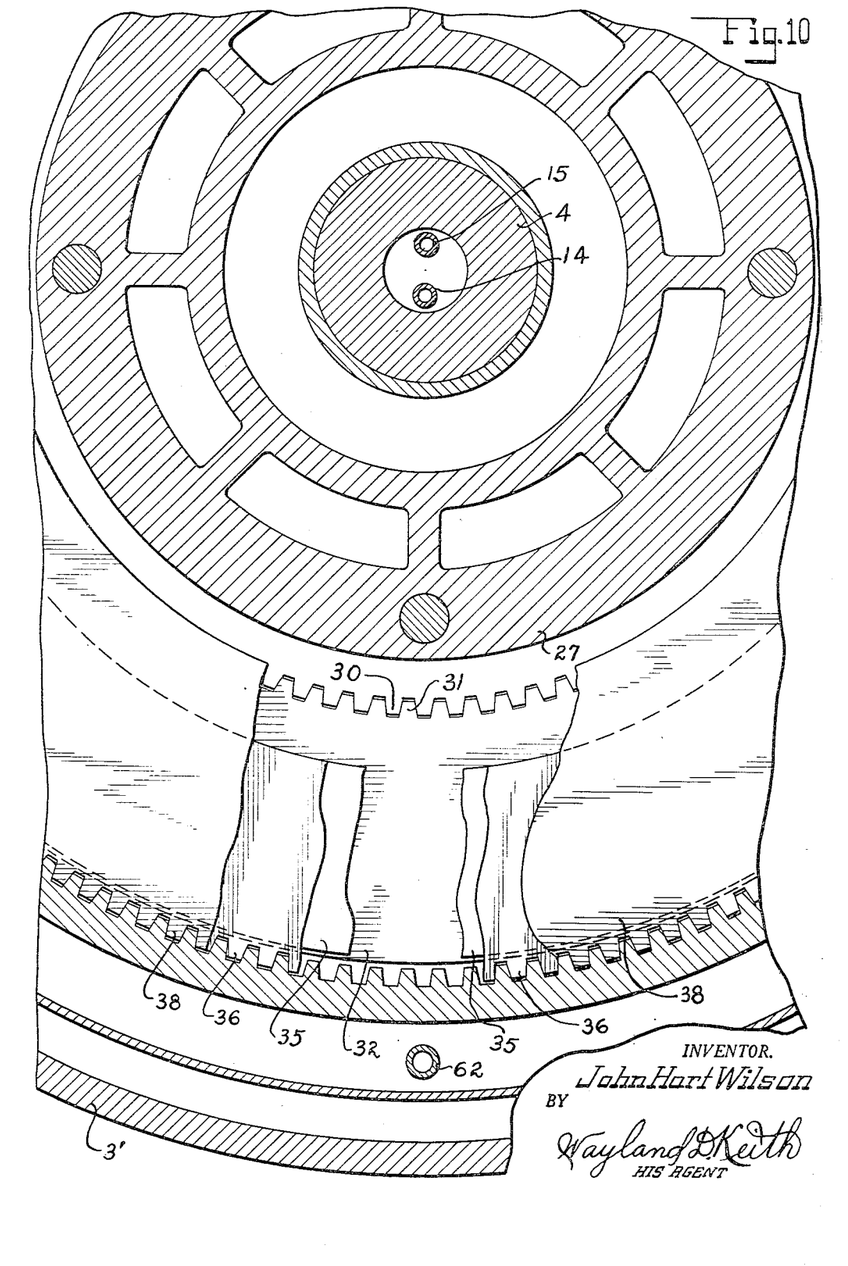
Fig. 10 is a cross section through the clutch.

The air tube 50 or 50' preferably is formed of heavy duty rubber with interwoven canvas and is so made as to expand axially upon the application of pressure as described. It is substantially flat in cross section with rounded edges, as shown in Fig. 9, and preferably has thickened lateral sides, as indicated at 51 in Fig. 9, one of which is vulcanized directly to the plate 48, or otherwise bonded thereto, or to the plate 44, or both, so as to hold the air tube securely to the plate. This bonded connection between the air tube 50 and the plate 48, and the circumferential confining of the plate 48 by the shoulder 49, will prevent radial distortion of the air tube as a result of centrifugal force when the driving member of the clutch is operating at high speed, and insures of the anchoring of the air tube within the driving elements under different operating conditions thereof.

The edge portions of the air tube are shown in Fig. 9 as provided with a torus-shaped chamber 50a connected through an appreciably thinner air space 51' to reduce appreciably the quantity of air required to expand the air tube. The chamber 50a allows greater flexibility at the edges for ready expansion.

The center portion of each air tube section 50 is provided with a spud 52 secured thereto, as by vulcanizing it in place in a wall of the air tube at the center of the plate 48, as indicated at 53, Fig. 9, so as to anchor the spud securely therein and to provide for the circulation of air into the air tube when desired.

Figure 11:
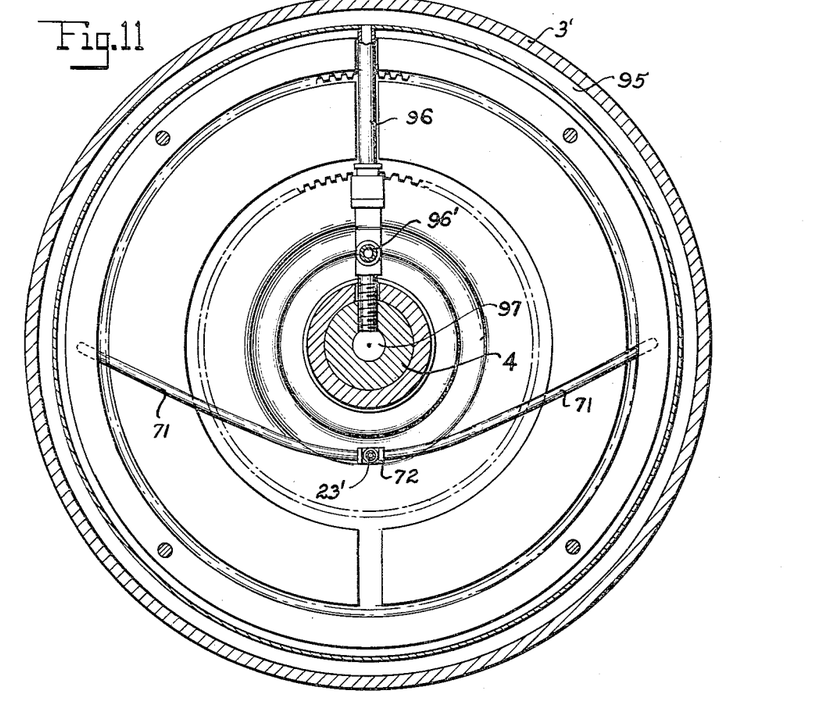
Fig. 11 is a cross section on the line 11—11 in Fig. 5.

The spud 52 is connected with a coupling 54 into which a pipe section 55 is threaded, as indicated at the top in Fig. 3 and in Fig. 4. The pipe 55 extends radially in a groove 56 formed in the cover plate 40 on the front face thereof and extends outwardly to a coupling 57 to which a dump valve 58 is connected. A flexible hose 59 is connected with the dump valve 58 and extends to a T 60 at the outer end of the pipe 23, see Figs. 3 and 4. A similar connection 54—59 is provided for each section or each diametrically opposite portion of the air tube 50, the respective hoses 59 being connected to opposite sides of the T 60, the arrangement being similar to that shown at 72 in Fig. 11 with respect to the low speed clutch, yet to be described.

Each hose 59 is so mounted in the flange structure of the drum that it will flex and have a tendency to project outwardly when released from its connections 57—58. Thus access may be had to these parts for disconnection or repair upon removal of the chain guard 29. The pipe 55 and coupling 57 are secured in exposed positions to which a workman can gain access readily for removal of these parts. Upon disconnection of the coupling 57, the dump valve 58 will be projected forwardly into an exposed position by the flexing of the hose 59, enabling the workman to gain access thereto, as may be required.

Provision is made for the circulation of air through the spaces between the ribs 45 and outward through peripheral openings 61 in the ring 24 for a cooling effect on the clutch members. Additional peripheral openings 62 are provided in the ring for the circulation of air outwardly from the region of the clutch plate.

The operation of this form of clutch will be evident from the foregoing description. The valve 22 is actuated to connect the source of air supply with the pipe 21, communicating through the pipe 14 with the pipe 23, thence through the hose 59 to the respective dump valves 58, couplings 57, pipes 56 and couplings 54 to the respective opposite sides of the air tube 50.

As air is admitted to the air tube 50 or the sections thereof, this tube will be expanded axially in an inward direction, since it is confined on its outer side by the plates 40 and 48, and will press inward against the plate 44, acting through the ribs 45, plate 38 and friction disc 34, to press the driving plate 32 against the friction plate 33, axial displacement of the latter being resisted by the back-up plate 26.

The discs 33, 34 and 32 are permitted to move axially in response to such pressure by the toothed connections 30, 31, with the spider 27, and by the toothed connections 36 and 37 of the discs 33 and 34 with the surrounding ring 24. These toothed connections maintain the driving relation with the driving and driven parts while permitting the plates to move axially in response to such axial pressure by the air tube 50.

As air under pressure is admitted to the air tube 50, the clutch plates 32—44 will be moved into frictional engagement causing the plate 32, which rotates with the spider 27, to transmit movement to the driven clutch discs 33 and 34, which, in turn, transmit motion to the inter-connected drum driving ring 24 which is attached to the flange 3 of the drum 2. In this way the driving force will be transmitted from the sprocket wheel 28 and the spider 27 to the drum 2 to cause rotation thereof at the driving speed.

The low speed clutch is applied to the opposite end wall or flange 3 of the drum 2, as shown in Fig. 5. The construction and operation of the low speed clutch are similar to the high speed clutch described above, except as hereinafter noted.

The low speed clutch has a driving sprocket 63 appreciably enlarged in diameter with respect to the driving sprocket 28 of the high speed clutch, as will be evident by comparing Figs. 3 and 5. The sprocket 63 is connected with a spider 64 which, in turn, is connected to two driving clutch plates 65, as compared with the single clutch plate 32 in the high speed clutch. The driving clutch plates 65 are connected with the spider 64 through interconnected teeth 65' similar in effect to the teeth 30—31, as described above.

Likewise molded asbestos driven clutch discs 66 are interposed between the driving clutch plates 65 and also between the latter and a back-up plate 67, secured to the end flange of the drum 2. An opposite clutch disc 68 is on the outer pressure side of the clutch plate 65, which clutch discs 66, 68 have toothed connections 66' with the drum driving ring 69 which is attached to the end flange of the drum 2.

The air tube is shown at 70, constructed of one annular section or of two sections as described above and shown in detail in Figs. 7 to 9. The air tube 70 is supplied with air under pressure through the flexible hose 71 which are connected with a T 72, and which, in turn, is connected with the supply pipe 23', as described above. The connections from the air tube 70 to the hose 71 and with the T 72, are substantially identical with the corresponding parts described in connection with Figs. 3 and 4.

When valve 22 (Fig. 1) is suitably actuated, air under pressure flows through pipes 20 and 15, conduit 23', and hose 71 to the air tube 70, expanding the latter away from the back-up plate 70' in an axial direction toward the right in Fig. 5. This expanding action will press the clutch disc 68 into frictional pressure relation against the first driving clutch plate 65, which movement will be transmitted through the interposed clutch discs 66 to the second clutch plate 65, and through this, in turn, to the clutch disc 66 at the right against the back-up plate 67, thereby firmly pressing the several clutch plates into clutching engagement with each other, and connecting the spider 64 in driving relation with the drum drive ring 69 on the drum 2. These parts will be restored to their released and disconnected positions upon closure of valve 22 and release of pressure through the dump valve.

The structure provides a simple and effective clutch mechanism for driving the drum 2 either in high or low speed, and without the mechanical connections heretofore required in such clutches. The parts are assembled so as to be readily available for assembly, for replacement, or for repair.

Figure 6:
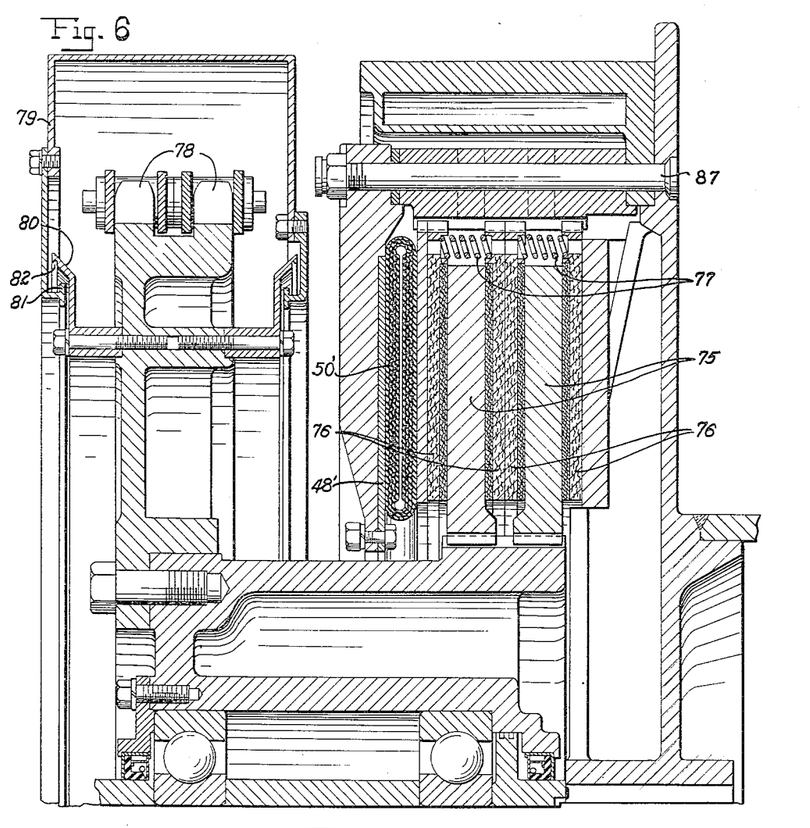
Fig. 6 is a similar view on enlarged scale, showing a modification of the clutch.

In the modification shown in Fig. 6, the construction generally is similar to that shown in Fig. 5, and is operated in substantially the same manner as described above. In this form, however, the multiple clutch plates, here designated as 75, are separated from the frictional clutch discs 76 by a series of circumferentially spaced compression springs 77 mounted between the facing clutch discs 76 on opposite sides of each clutch plate 75. These springs serve to spread apart these clutch plates evenly so that the intermediate clutch plates float freely therebetween when the clutch is inoperative.

A further modification is shown in Fig. 6, in the oil seal provided for the chain guard 79 around the driving sprocket wheel 78. This form of oil seal uses a truncated conical flange 80 on the sprocket wheel 78, at each side of the wheel, which flange 80 overlaps an outwardly projecting flange 81 on the chain guard. The flange 80 has a groove 82 in the inner face thereof to cooperate with the flange 81 in catching the oil and acting as an oil seal.

Figures 13, 14, 15, 16, 17:
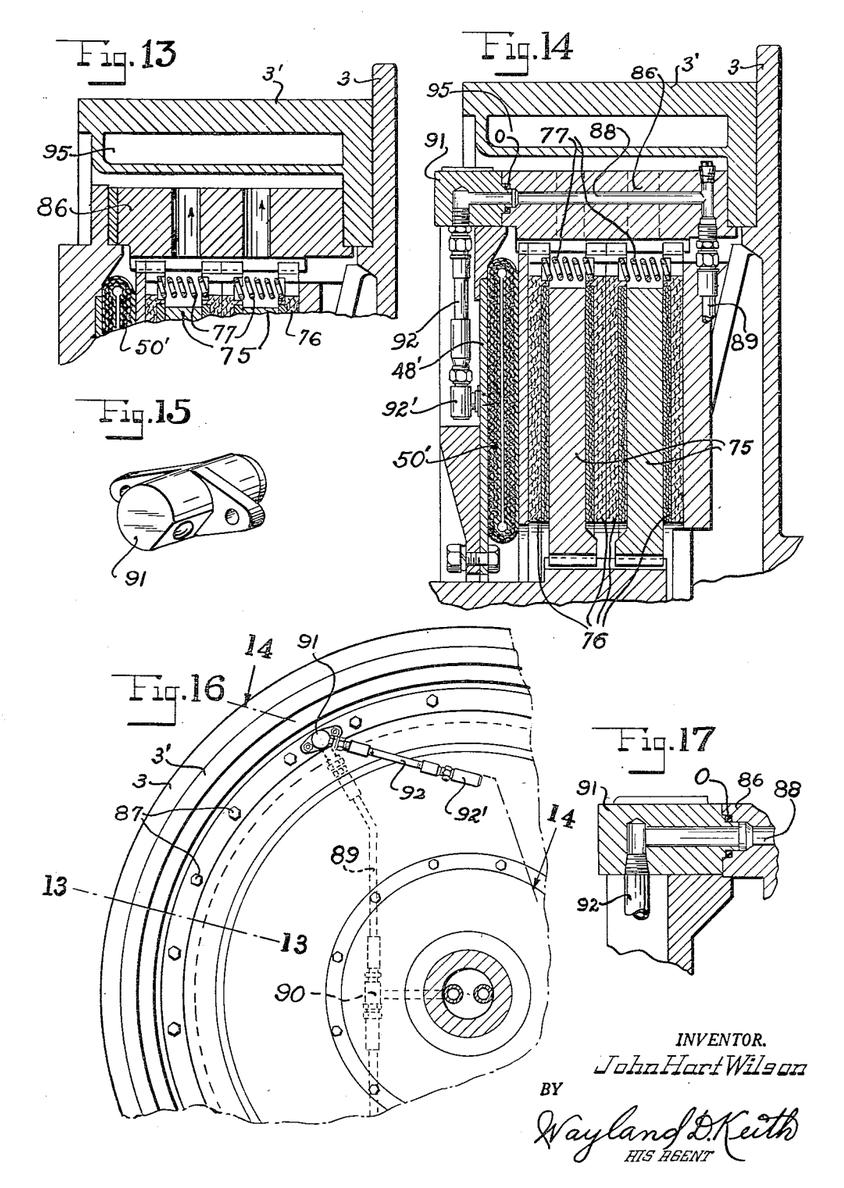
Fig. 13 is a detail cross section through the clutch, on the line 13—13 in Fig. 16.
Fig. 14 is a similar view on the line 14—14 in Fig. 16.
Fig. 15 is a detached perspective view of an air coupling therefor.
Fig. 16 is a partial end elevation of the clutch showing a modification therein.
Fig. 17 is an enlarged cross section through the air coupling.

In the form of the invention shown in Figs. 6, 7 and 13 to 17, the clutch structure is substantially the same as described above. In this form, however, the fluid supply pipe is connected with the air tube 50' through the driven ring 86. The ring 86 is secured to the flange 3 by bolts 87 that confine the parts of the assembly together and are spaced circumferentially therearound, as shown in Fig. 16.

The ring 86 has transverse holes 88 therethrough on different sides of the center thereof, each hole being connected at one end with a tube 89 extending to a fitting 90 connected with one of the air supply pipes. At the opposite end of the hole 88 is secured a fitting 91 secured in sealed relation to the ring 86 by a sealing ring O. A tube 92 is connected with the fitting 91 and leads to a dump valve or quick release valve 92', opening into one side or section of the air tube 50', for supplying air thereto or releasing air therefrom.

This construction materially simplifies the transmission of the air supply to the outer side of the clutch, insuring of its connection without undue complexity.

While the invention has been described as using two driving clutch plates interposed between driven clutch plates, in the low speed clutch, it is evident that the number of clutch plates may be varied in either clutch as desired, using fewer or more plates.

The brake ring 3' is shown as provided with the usual water jacket 95, to which cooling water is supplied through the usual water pipes 96, 96' connected with a bore 97 in the shaft 4.

It will be appreciated that by supplying fluid under pressure through the driven clutch ring from the inner to the outer side of the clutch, the expansible tube may be located in an accessible position, remote from the drum. At the same time, this arrangement permits the cooling of the brake ring by circulating water through a jacket, with its attendant advantages.

While the invention has been illustrated and described in certain embodiments thereof, it is recognized that variations and changes may be made therein without departing therefrom, except as specified in the claims.

This application is a continuation of my copending application Serial No. 61,565, filed November 23, 1948, now abandoned.

Having thus described the invention, what is claimed as new and desired to be secured by Letters Patent is:

1. In a fluid pressure actuated clutch assembly for use in a recess formed in a drum flange, a rotary drive member, a rotary driven member, coacting friction discs interposed between said drive and driven members, certain of said friction discs being engageable with said drive member and certain of said friction discs being engageable with said driven member, said discs being axially movable within said recess, an attachable plate mounted on the outer end of said recessed drum flange, an axially expansible tube member disposed intermediate the outermost of said friction discs and said plate for actuating said friction discs, said outermost friction discs and said plate being non-rotatable relative to said axially expansible tube member, means conducting a pressure fluid to the inner axial side of said drum flange recess, and means including a flexible conduit for conducting said pressure fluid from said means to the outer axial face of said axially expansible tube member.

2. A power driven hoisting drum mounted on a shaft for rotation therewith, at least one end of said drum being provided with a brake ring, said brake ring being provided with a system, including a fluid actuated clutch, clutch friction elements located within said brake ring, a fluid actuated element for engaging said clutch friction elements in said brake ring, said fluid actuated element being located at that side of the clutch friction element remote from said drum, a drive ring member surrounding said clutch friction elements and being connected in driving relation with at least part of said friction elements, means securing said driving ring member to said drum ends, a rotary fluid joint on said drum shaft, a fluid passage formed within said driving ring member, the inner end of said fluid passage being connected by conduit means to said rotary fluid joint, the outer end of said fluid passage being connected by conduit means to said fluid actuated element, and a holding plate rotatable with and detachably secured to the outer side of said fluid actuated element, said fluid actuated element being removable upon the removal of said holding plate from said driving ring member.

3. A power driven hoisting drum mounted on a shaft for rotation therewith, each end of said drum being provided with a brake ring, each of said brake rings being provided with a system including a jacket within said brake ring for circulating water therethrough, a fluid actuated clutch, clutch friction elements located within each of said brake rings, a fluid actuated element for engaging said clutch friction elements in each of said brake rings, said fluid actuated elements being loacted at that side of the respective clutch friction element remote from said drum, a driving ring member surrounding the clutch friction elements and connected in driving relation with at least part of the friction elements, means securing said driving ring members to said respective drum ends, a rotary fluid joint on said drum shaft, a fluid passage formed within each of said driving ring members, the inner end of each of said fluid passages being connected by conduit means to said rotary fluid joint, the other end of each of said fluid passages in said driving ring members being connected by conduit means to the respective fluid actuated elements, a holding plate rotatable with and detachably secured to the outer side of each of said driving ring members and exteriorly of said fluid actuated elements, each of said fluid actuated elements being removable upon the removal of the respective holding plates from said respective driving members.

4. A power driven hoisting drum mounted on a shaft for rotation therewith, each end of said drum being provided with a brake ring, each of said brake rings being provided with a system, including a jacket within said brake ring, for circulating cooling water therethrough, a fluid actuated clutch, clutch friction elements located within each of said brake rings, a fluid actuated element for engaging said clutch friction elements in each of said brake rings, said fluid actuated elements being located at that side of the respective clutch friction elements remote from said drum, a holding plate rotatable with and detachably secured to the outer side of each of said brake rings and exteriorly of said fluid actuated elements, each of said fluid actuated elements being removable upon the removal of the respective holding plates from said brake rings, a rotary fluid joint connected to one end of said drum shaft, a pair of fluid conduits within said shaft communicating with said rotating fluid coupling, each of said conduits conveying fluid to a point within one of said brake rings and adjacent said drum, a clutch driven ring secured in each of said brake rings, each of said clutch driven rings having a passage formed therethrough, and means including said passages connecting each of said conduits with one of the associated fluid actuating elements.

References Cited in the file of this patent

UNITED STATES PATENTS

| | | |
|---|---|---|
| 2,395,239 | White et al. | Feb. 19, 1946 |
| 2,622,714 | Cardwell | Dec. 23, 1952 |